(12) United States Patent
Sato et al.

(10) Patent No.: US 9,001,480 B2
(45) Date of Patent: Apr. 7, 2015

(54) DISTRIBUTED ENERGY RESOURCES CONTROL APPARATUS AND DISTRIBUTED ENERGY RESOURCES CONTROL METHOD

(71) Applicant: Hitachi, Ltd., Tokyo (JP)

(72) Inventors: Yasuo Sato, Hitachinaka (JP); Takafumi Ebara, Yokohama (JP); Masahiro Watanabe, Hitachi (JP); Tsukasa Onishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 13/770,177

(22) Filed: Feb. 19, 2013

(65) Prior Publication Data

US 2013/0258730 A1    Oct. 3, 2013

(30) Foreign Application Priority Data

Mar. 27, 2012  (JP) .................................. 2012-072091

(51) Int. Cl.
*H02H 7/00* (2006.01)
*H02M 7/00* (2006.01)
*H02M 1/42* (2007.01)
*H02M 1/38* (2007.01)

(52) U.S. Cl.
CPC .............. *H02M 7/00* (2013.01); *H02M 1/4225* (2013.01); *H02M 2001/385* (2013.01); *Y02B 70/126* (2013.01)

(58) Field of Classification Search
USPC ..................................................... 361/65, 88
See application file for complete search history.

(56) References Cited

U.S. PATENT DOCUMENTS 5,335,135 A  *  8/1994  Kinney ............................ 361/79
2008/0100975 A1*  5/2008  Myoung et al. .................. 361/65

FOREIGN PATENT DOCUMENTS

| JP | 2000-341958 A | 12/2000 |
| JP | 2005-33851 A | 2/2005 |
| JP | 2007-37354 A | 2/2007 |
| JP | 2008-125290 A | 5/2008 |
| JP | 2008-271777 A | 11/2008 |

OTHER PUBLICATIONS

Japanese Office Action received in Japanese Application No. 2012-072091 dated Mar. 11, 2014.

* cited by examiner

*Primary Examiner* — Gary L Laxton
*Assistant Examiner* — Afework Demisse
(74) *Attorney, Agent, or Firm* — Mattingly & Malur, P.C.

(57) ABSTRACT

A distributed energy resources control apparatus for controlling power from a distributed energy resource in a system section separable from a power system includes a detecting unit, a receiving unit, and a control unit. The detecting unit detects a fault of the power system. The receiving unit receives a signal indicating authorization for the distributed energy resource to perform independent operation as linking with the system section, when the system section is separated from the power system. The control unit controls a power converter converting power from the distributed energy resource and outputting to the system section, based on measurement results of a voltage and a frequency of the system section, when the fault is detected and the signal is received.

7 Claims, 13 Drawing Sheets

FIG. 5

PROPRIETY SETTING OF INDEPENDENT OPERATION

| FEEDER ID | IMPORTANT LOAD ID | PROPRIETY |
|---|---|---|
| 1001 | — | ☐ |
| 1002 | G01, G02 | ☐ |
| 1003 | H03 | ☐ |
| ... | ... | ... |

CANCEL  REGISTER

| ISLANDING OPERATION DETECTION SIGNAL | INDEPENDENT OPERATION ENABLING SIGNAL | CONTROL MODE |
|---|---|---|
| 0 | 0 | WIDE-AREA SYSTEM INTERCONNECTION |
| 0 | 1 | WIDE-AREA SYSTEM INTERCONNECTION |
| 1 | 0 | SELF-SUSTAINING OPERATION |
| 1 | 1 | INDEPENDENT-AREA SYSTEM INTERCONNECTION |

200
DISTRIBUTED ENERGY RESOURCES CONTROL APPARATUS AND DISTRIBUTED ENERGY RESOURCES CONTROL METHOD

BACKGROUND OF THE INVENTION

The present invention relates to a technology to control power from distributed energy resources linking with a power system.

A route and an electric facility to provide commercial power supply from a power supplier such as a power company to individual users (private houses, buildings, factories, and the like) are called a power system. In the usual case, individual users, except some large-scale users, have used only the commercial power supply from the power system.

However, in recent years, popularization of the energy sources with a small load to the environment such as solar photovoltaic power generation, wind power generation, a heat pump, and a fuel cell has been desired. Because these power supplies are installed at individual users, they are called distributed energy resources, as compared with conventional large-scale electric power plants established in concentrated ways at places apart from urban areas.

In the case where a failure occurs in the power system, it is necessary to shut down all the distributed energy resources connected to the power system evenly for work. Accordingly, the distributed energy resource is equipped in advance with an apparatus to prevent islanding operation (JP-A-2007-37354, JP-A-2005-33851). In addition, there has been proposed a method for contributing in maintaining a voltage and a frequency flexibly and simply by improving an inverter apparatus of the power supply assuming an independent power supply system for power supply for an isolated island or power supply for a disaster area (JP-A-2000-341958).

SUMMARY OF THE INVENTION

Because a conventional technology assumes to prevent islanding operation of the distributed energy resources in the case of a fault of the power system, it is impossible to effectively utilize the distributed energy resources dispersed in an area where outage occurs in the case where a large-scale natural disaster occurs.

In addition, in the case where a certain system section is separated from the power system and becomes a separated system or the like, a control method required for the distributed energy resources changes depending on a state of the power system with which the distributed energy resources link. For example, a change in voltage characteristics or frequency characteristics of a load is expected. Furthermore, in the power system in which many distributed energy resources linked via inverters represented by solar photovoltaic power generations are introduced, insufficient synchronizing power becomes an issue. In the case where there is a large-scale change of the system configuration, a conventional control method for the distributed energy resources could not maintain system operation.

Accordingly, it is an objective of the present invention to provide a technology to effectively utilize distributed energy resources in a system section separable from a power system.

To solve the above problem, one aspect of the present invention is a distributed energy resources control apparatus for controlling power from a distributed energy resource in a system section separable from a power system which includes a detecting unit, a receiving unit, and a control unit. The detecting unit detects a fault of the power system. The receiving unit receives a signal indicating authorization for the distributed energy resource to perform independent operation as linking with the system section, when the system section is separated from the power system. The control unit controls a power converter converting power from the distributed energy resource and outputting to the system section, based on measurement results of a voltage and a frequency of the system section, when the fault is detected and the signal is received.

According to the present invention, distributed energy resources in a system section separable from a power system can be effectively utilized.

Other objects, features, and advantages of the invention will become apparent from the following description of the embodiments of the invention taken in conjunction with the accompanying drawings.

BRIEF DESCRIPTION OF THE DRAWINGS

FIG. 5 shows a screen example for setting propriety of islanding operation (independent operation) of a distributed energy resources system in advance;

DESCRIPTION OF THE EMBODIMENTS

Explanation is given below on embodiments of the present invention with reference to the accompanying drawings.

Here, a distributed energy resources control apparatus, which is an application example of the present invention, and an independent operation monitor/control apparatus for controlling it are explained.

The independent operation monitor/control apparatus transmits an enabling signal for authorizing islanding operation of distributed energy resources to the distributed energy resources control apparatus as for a system section separated from the power system. Which of distributed energy resources are authorized to operate may be set in advance by an administrator or may be instructed by remote operation.

In this way, in the case where a fault occurs in the power system due to earthquake or the like, it is possible to supply power to a system section by islanding operation of the distributed energy resources provided in the system section. Accordingly, in the fault of the power system, power can be supplied to electric loads (users) existing in the system section and, thus, convenience can be enhanced.

Also, the distributed energy resources control apparatus switches over a control method of a power converter to convert power from the distributed energy resources based on the fault of the power system and the enabling signal. By performing suitable control of the power converter in the case of supplying power from the distributed energy resources to electric loads in the system section, stable power can be supplied from the distributed energy resources to the system section.

Embodiment 1

Figure 1:
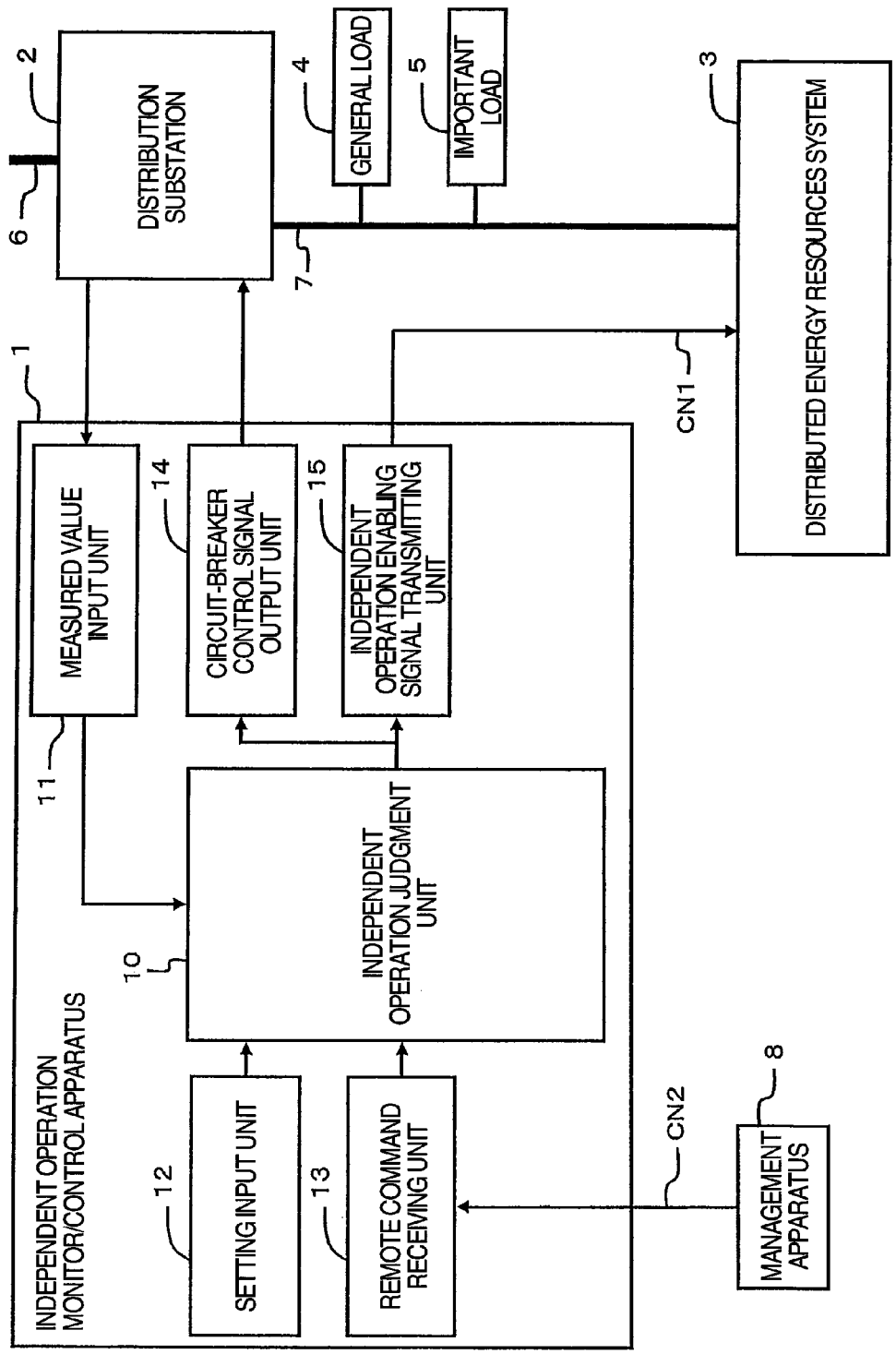
FIG. 1 shows a functional configuration of a power distribution system.

FIG. 1 is the whole configuration diagram of a power distribution system. The power distribution system can comprise, for example, an independent operation monitor/control apparatus 1 (hereafter, the monitor/control apparatus 1), a distribution substation 2, a distributed energy resources system 3, a general load 4, and an important load 5. It should be noted that a configuration of the power distribution system differs in respective countries. The configuration shown in FIG. 1 is one example thereof, and the present invention is applicable also to a power distribution system other than the configuration shown in FIG. 1.

The distribution substation 2 decreases a voltage value of power supplied from a power facility via a trunk power transmission network 6 to provide power of a prescribed voltage to each user having the general load 4 or the important load 5. The distribution substation 2 supplies power to each user via a plurality of distribution feeders (power supply lines) 7.

Here, users may be classified largely into, for example, general users (general loads) 4 and important users (important loads) 5. In the figure, a user is represented as an electric load. In the explanation below, the general users are called the general loads, and the important users are called the important loads. As the general loads 4, there are included, for example, a usual private house, an office building, a commercial facility, and the like. As the important loads 5, loads at places where power supply should be maintained when a disaster occurs such as, for example, a hospital, a government office, a police station, and a fire station.

The monitor/control apparatus 1 is configured as a computer system and it is designed to implement prescribed functions by performing, for example, prescribed computer programs by a micro processor. The monitor/control apparatus 1 is connected to the distributed energy resources system 3 via a first communication network CN1. Further, the monitor/control apparatus 1 is connected to a management apparatus 8 via a second communication network CN2. The first communication network CN1 and the second communication network CN2 may be configured as a common communication network or may be configured as different communication networks, respectively.

The monitor/control apparatus 1 comprises, as functions thereof, for example, an independent operation judgment unit 10, a measured value input unit 11, a setting input unit 12, a remote command receiving unit 13, a circuit-breaker control signal output unit 14, and an independent operation enabling signal transmitting unit 15.

The independent operation judgment unit 10 judges whether the distribution feeder 7 as a prescribed system section separated from the power system should be operated independently or not. The independent operation means an islanding operation of the distributed energy resources system 3 connected to the distribution feeder 7 separated from the power system, and is an operation state in which power supply from the distributed energy resources system 3 to the distribution feeder 7 is authorized.

The measured value input unit 11 monitors a state of power supplied to the distribution substation 2. The independent operation judgment unit 10 monitors based on a power supply state detected by the measured value input unit 11 whether power supply to the distribution substation 2 is cut off or not.

When power supply from the trunk power transmission network 6 to the distribution substation 2 is stopped, the independent operation judgment unit 10 judges whether islanding operation of the distributed energy resources system 3 should be authorized or not based on propriety determination information input from either the setting input unit 12 or the remote command receiving unit 13.

The propriety determination information is preset information on whether islanding operation of the distributed energy resources system 3 connected to the distribution feeder 7 separated from the power system should be authorized or not. The setting input unit 12 as the "setting unit" can generate and output a setting screen 120 as shown in FIG. 5.

Referring to FIG. 5, explanation is given first on configuration of the setting screen 120. The setting screen 120 comprises, for example, a distribution feeder identifier column 121, an important load identifier column 122, and a propriety flag column 123. The distribution feeder identifier column 121 memorizes feeder identifiers for identifying respective distribution feeders 7. Incidentally, in the figure, the "identifier" is expressed as "ID". The important load identifier column 122 memorizes important load identifiers for identifying important loads 5, which are connected to the distribution feeders 7 specified by the distribution feeder identifier column 121. The propriety flag column 123 memorizes a control flag indicating whether independent operation (islanding operation of the distributed energy resources system 3) should be authorized or not in the case where the distribution feeder 7 specified by the distribution feeder identifier column 121 is separated from the power system.

An administrator who manages the monitor/control apparatus 1 sets propriety of independent operation for each distribution feeder 7 using the setting screen 120. When the administrator operates a registration button 124, contents set at the setting screen 120 are registered. A cancellation button 125 is provided to cancel setting of the propriety information provided in the setting screen.

The remote command receiving unit 13 as a "setting unit" receives the propriety determination information from the external management apparatus 8. The management apparatus 8, for example, may be configured as a part of a centralized power monitor/control system. Alternatively, the management apparatus 8 may be configured as a personal computer or an information processing terminal (including a mobile phone) held by the administrator. In the present embodiment, as the setting unit for setting the propriety determination information, both of the setting input unit 12 and the remote command receiving unit 13 are exemplified; however, a configuration provided with either of them is accepted.

Figure 3:
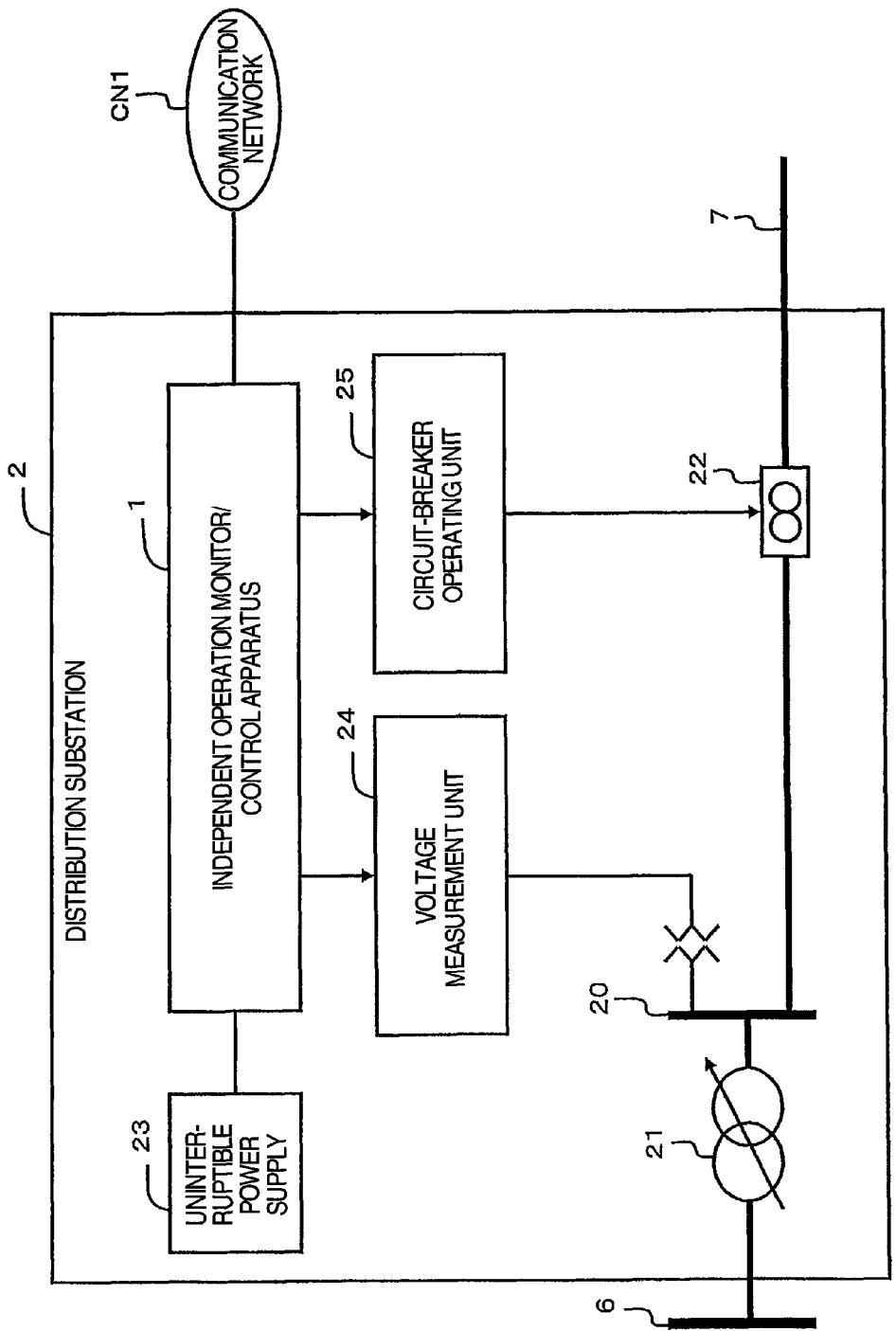
FIG. 3 shows a configuration of a distribution substation.

The circuit-breaker control signal output unit 14 outputs a control signal for controlling an action of a circuit breaker 22 installed between the power system and the distribution feeder 7 (refer to FIG. 3). The circuit-breaker control signal output unit 14 may be expressed, for example, as "an open/close operating unit to output a signal for operating the open/close unit for connecting/disconnecting the power system and the prescribed system section".

When an opening signal is transmitted from the circuit-breaker control signal output unit 14 to the circuit breaker 22, the circuit breaker 22 becomes an open state, and the distribution feeder 7 connected to the circuit breaker 22 is separated from the power system (the trunk power transmission network 6). When a closing signal is transmitted from the circuit-breaker control signal output unit 14 to the circuit breaker 22, on the contrary, the circuit breaker 22 becomes a closed state, and the distribution feeder 7 connected to the circuit breaker 22 is connected again to the power system.

The independent operation enabling signal transmitting unit 15 as "an enabling signal transmitting unit" transmits a signal for authorizing independent operation (islanding operation) to the distributed energy resources system 3 connected to the distribution feeder 7 of which independent operation is authorized. Hereinafter, the independent operation enabling signal may be abbreviated as the "enabling signal".

As described above, when power supply from the trunk power transmission network 6 to the distribution substation 2 is stopped, the independent operation judgment unit 10 judges whether a flag authorizing independent operation as for the distribution feeder 7 has been set or not. In the case where the authorization flag has been set, the independent operation judgment unit 10 makes the circuit-breaker control signal output unit 14 output the opening signal to separate its distribution feeder 7 from the power system. Subsequently, the independent operation judgment unit 10 makes the independent operation enabling signal transmitting unit 15 transmit the enabling signal for authorizing independent operation to the distributed energy resources system 3 connected to the distribution feeder 7 separated.

Figure 2:
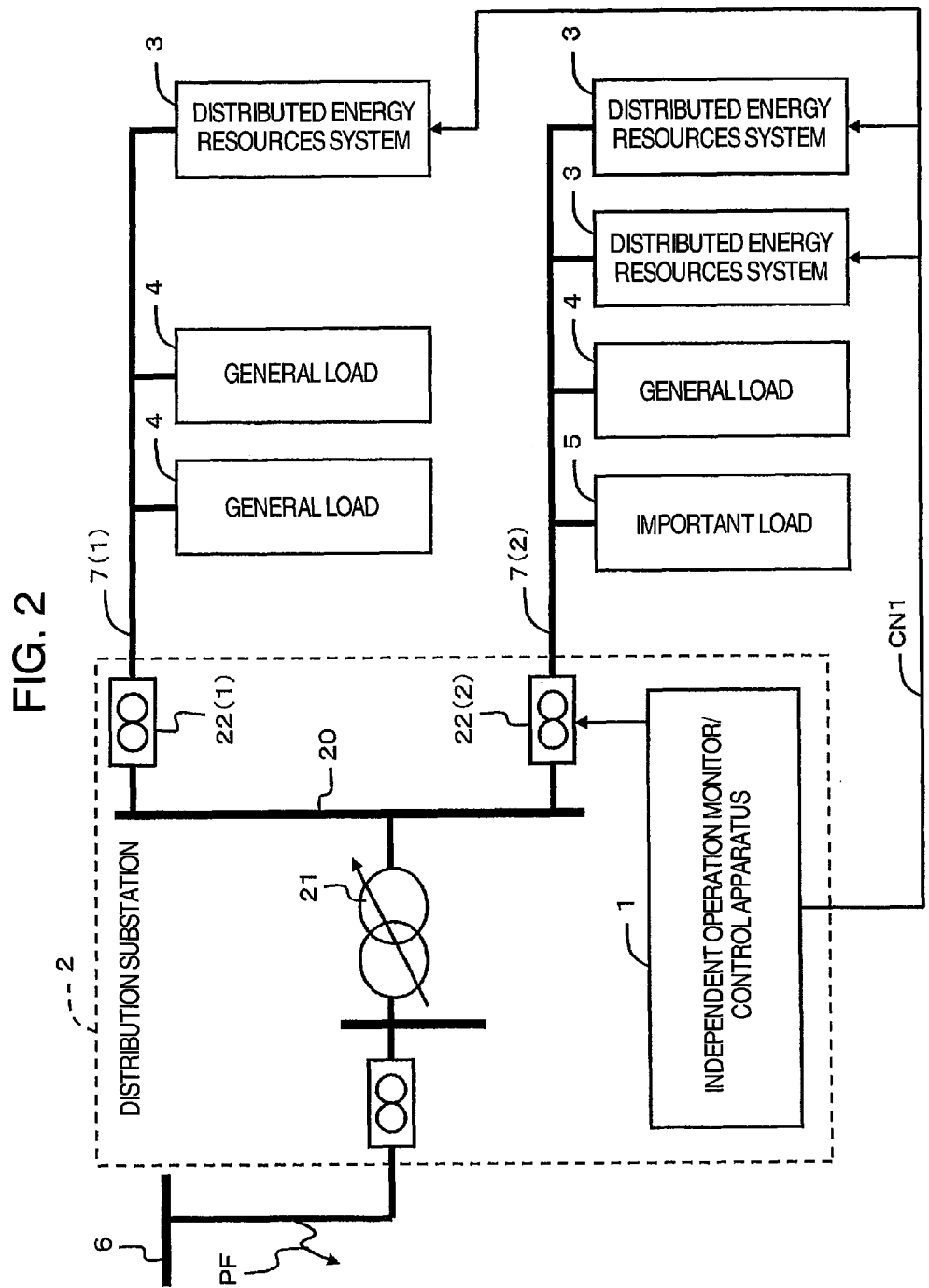
FIG. 2 shows a configuration example of a power distribution system.

While a configuration of the distributed energy resources system 3 is described later in FIG. 4, reference is given first to FIG. 2. FIG. 2 schematically shows a configuration of a power distribution system. In FIG. 2, the monitor/control apparatus 1 is installed inside the distribution substation 2. It should be noted that a configuration of installing the monitor/control apparatus 1 outside of the distribution substation 2 may also be considered.

The distribution substation 2 converts the voltage value of power supplied from the trunk power transmission network 6 to a prescribed voltage value at a transformer 21, and outputs it to a bus bar 20. To the bus bar 20 for power distribution, a plurality of distribution feeders 7(1) and 7(2) are connected via circuit breakers 22(1) and 22(2). To a distribution feeder 7(1), power is supplied from the distribution substation 2 via a circuit breaker 22(1). To another distribution feeder 7(2), power is supplied from the distribution substation 2 via another circuit breaker 22(2).

To the one distribution feeder 7(1), a plurality of general loads 4 and one distributed energy resources system 3 are connected. To the other distribution feeder 7(2), a general load 4 and an important load 5, and a plurality of distributed energy resources systems 3 are connected.

In the distribution feeder 7(1), there are not many distributed energy resources systems 3, and there is not an important load 5 requiring power supply at the time of disaster. Accordingly, an administrator may set a flag so as not to authorize independent operation as for the distribution feeder 7(1).

On the other hand, in the other distribution feeder 7(2) there is provided with an important load 5 to which power should be supplied also at the time of disaster, and there are a plurality of distributed energy resources systems 3. Accordingly, the administrator may set a flag so as to authorize independent operation as for the other distribution feeder 7(2).

In this way, the administrator may decide in advance a distribution feeder 7 for which independent operation is authorized at the time of disaster based on, for example, a type and the number of important loads 5 included in the distribution feeder 7 and the number and the total power generation capability of distributed energy resources systems 3 included in the distribution feeder 7.

FIG. 3 shows a functional configuration of the distribution substation 2. At the distribution substation 2, as described above, the monitor/control apparatus 1 can be installed. The distribution substation 2 comprises, for example, the transformer 21 installed between the bus bar 20 and the trunk power transmission network 6, a circuit breaker 22 installed between the bus bar 20 and the distribution feeder 7, a voltage measurement unit 24 connected to the measured value input unit 11, and a circuit-breaker operating unit 25 connected to the circuit-breaker control signal output unit 14.

An uninterruptible power supply 23 provides power to the monitor/control apparatus 1 in the case where power supply from the trunk power transmission network 6 to the distribution substation 2 is stopped. The voltage measurement unit 24 measures a voltage value of the bus bar 20. The measured voltage value is input from the voltage measurement unit 24 to the measured value input unit 11. The circuit-breaker operating unit 25 outputs a signal for opening and closing the circuit breaker 22, according to a control signal from the circuit-breaker control signal output unit 14.

Figure 4:
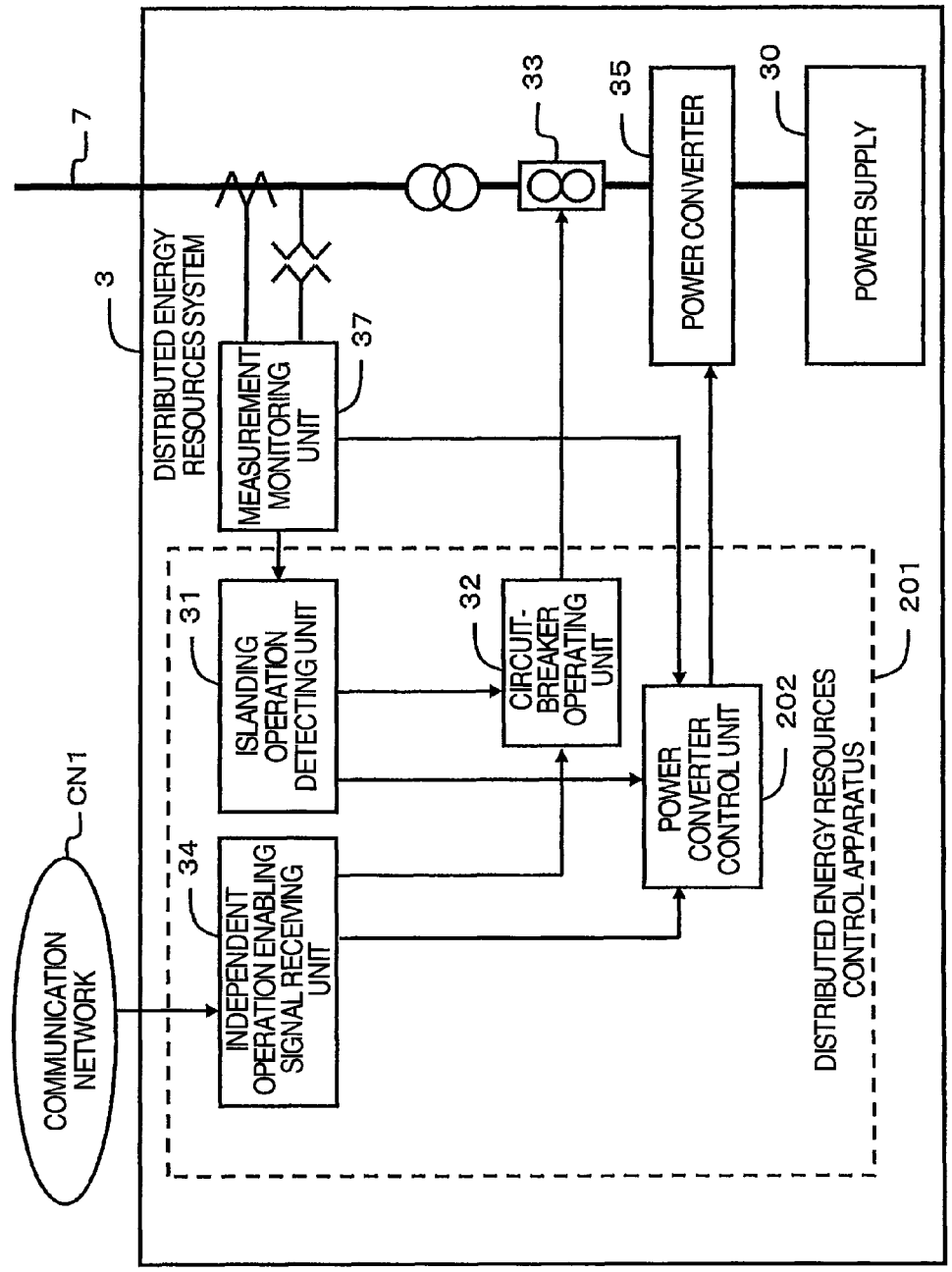
FIG. 4 shows a configuration of a distributed energy resources system.

FIG. 4 shows a configuration of the distributed energy resources system 3. The distributed energy resources system 3 of the present embodiment comprises a power supply 30, a circuit breaker 33, a power converter 35, a measurement monitoring unit 37, and a distributed energy resources control apparatus 201. The distributed energy resources control apparatus 201 comprises an islanding operation detecting unit 31, a circuit-breaker operating unit 32, an independent operation enabling signal receiving unit 34, and a power converter control unit 202. The islanding operation detecting unit 31, the circuit-breaker operating unit 32, the independent operation enabling signal receiving unit 34, and the power converter control unit 202 can be configured as electronic circuits, respectively. In addition, the distributed energy resources control apparatus 201 can be configured as a computer system and, for example, with a micro processor performing a prescribed computer program, prescribed functions can be implemented. Incidentally, the distributed energy resources control apparatus 201 may comprise the measurement monitoring unit 37. In addition, the distributed energy resources control apparatus 201 may comprise the power converter 35.

The power converter 35 is an electric circuit which can convert direct current and alternate current into each other. Also, the power converter 35 can adjust active power, reactive power, a power factor, and the like according to instructions from the power converter control unit 202.

The distributed energy resources control apparatus 201 switches over a control method of the power converter 35 based on detection results by the islanding operation detecting unit 31 and reception results by the independent operation enabling signal receiving unit 34.

The power supply 30 is configured like, for example, a solar photovoltaic power generation apparatus, a solar thermal power generation apparatus, a wind power generation apparatus, a fuel cell co-generator, or the like. Power generated by the power supply 30 is supplied to the distribution feeder 7 via the power converter 35. The power converter 35 is an electric circuit for converting direct current and alternate current into each other, adjusting a frequency, or adjusting a voltage value.

The measurement monitoring unit 37 performs measurement with regard to an electric current of the distribution feeder 7. The measurement results are, for example, a voltage, a frequency, a phase, and the like.

The islanding operation detecting unit 31 has a function of restraining an islanding operation state. The islanding operation detecting unit 31 detects a fault of the power system based on the measurement results by the measurement monitoring unit 37, and outputs an islanding operation detection signal based on the detection results to the circuit-breaker operating unit 32 and the power converter control unit 202. In the following explanation, a fault of the power system may be called a system fault. The system fault includes stoppage of power supply due to lightning strikes, earth faults, short circuits, or the like or stoppage of power supply of one line among a plurality of lines, or the like. The case where the islanding operation detecting unit 31 detects the system faults includes the case where the voltage of the distribution feeder 7 becomes a prescribed threshold value or lower, the case where the phase change of the distribution feeder 7 satisfies a prescribed phase change condition, the case where a reflection wave cannot be obtained in transmitting a pulse to the distribution feeder 7, or the like. The islanding operation detecting unit 31 instructs an output of the opening signal to the circuit-breaker operating unit 32 by the islanding operation detection signal in the case where a system fault is detected.

The circuit-breaker operating unit 32 has a function of operating opening and closing of the circuit breaker 33 installed between the distribution feeder 7 and the power converter 35. The circuit-breaker operating unit 32 outputs the opening signal to the circuit breaker 33 when output of the opening signal is instructed from the islanding operation detecting unit 31, so as to cut off between the distribution feeder 7 and the power converter 35 with the circuit breaker 33. In this way, power generated by the power supply 30 is prevented from flowing into the distribution feeder 7.

The independent operation enabling signal receiving unit 34 receives a signal for authorizing independent operation (an independent operation enabling signal) via the first communication network CN1 from the independent operation enabling signal transmitting unit 15 of the monitor/control apparatus 1. The independent operation enabling signal receiving unit 34 transmits the enabling signal to the circuit-breaker operating unit 32 to restrain the circuit-breaker operating unit 32 from outputting the opening signal to the circuit breaker 33. Hereinafter, an independent operation enabling signal transmitting unit 15 may sometimes be called an enabling signal transmitting unit 15, and an independent operation enabling signal receiving unit 34 may be called an enabling signal receiving unit 34.

The enabling signal receiving unit 34 will not transmit the enabling signal to the circuit-breaker operating unit 32 in the case where the enabling signal cannot be received from the enabling signal transmitting unit 15 of the monitor/control apparatus 1. Therefore, an output instruction of the opening signal, which is transmitted from the islanding operation detecting unit 31 to the circuit-breaker operating unit 32, becomes valid. As a result, the circuit-breaker operating unit 32 outputs the opening signal to the circuit breaker 33 to cut off electrically between the power converter 35 and the distribution feeder 7. In the following explanation, an instruction to have the circuit-breaker operating unit 32 output the opening signal to the circuit breaker 33 may be called a cut-off command.

As described above, the circuit-breaker operating unit 32 makes a cut-off command from the islanding operation detecting unit 31 invalid while the enabling signal is received from the enabling signal receiving unit 34, even in the case where the cut-off command from the islanding operation detecting unit 31 is received.

Explanation is given below on operation of the monitor/control apparatus 1 to authorize independent operation of the distributed energy resources system 3.

Figure 6:
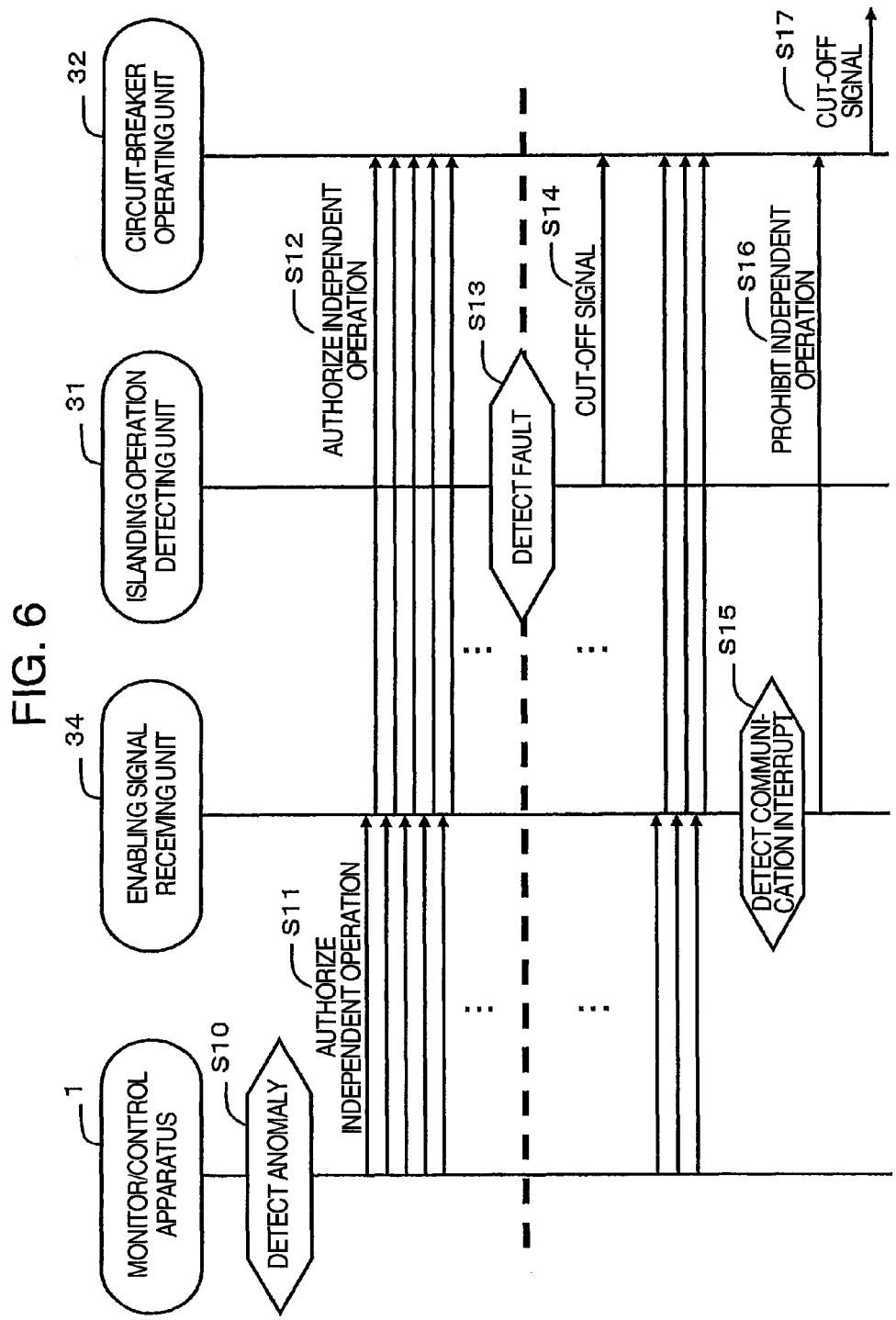
FIG. 6 is an explanatory diagram showing states of communication processings between an independent operation monitor/control apparatus and a distributed energy resources system.

FIG. 6 is one example of communication procedures between the monitor/control apparatus 1 and the distributed energy resources system 3. The monitor/control apparatus 1 monitors power supply from the trunk power transmission network 6 to the distribution substation 2, and judges whether an anomaly has occurred or not (S10).

When an anomaly is detected in power supply, the enabling signal transmitting unit 15 of the monitor/control apparatus 1 transmits the enabling signal in a prescribed cycle to the enabling signal receiving unit 34 of the distributed energy resources system 3 (S11). The enabling signal receiving unit 34 transfers the enabling signal received from the enabling signal transmitting unit 15 of the monitor/control apparatus 1 to the circuit-breaker operating unit 32 (S12). In this way, the cut-off command input from the islanding operation detecting unit 31 to the circuit-breaker operating unit 32 becomes invalid.

It should be noted that the enabling signal receiving unit 34 may generate a new enabling signal and transmit it to the circuit-breaker operating unit 32, instead of transferring the enabling signal received from the enabling signal transmitting unit 15 to the circuit-breaker operating unit 32.

As described above, the cut-off command input from the islanding operation detecting unit 31 to the circuit-breaker operating unit 32 becomes invalid. Accordingly, the circuit breaker 33 will not open even when the islanding operation detecting unit 31 detects stopping of power supply from the distribution feeder 7 (S13) and transmits the cut-off command to the circuit-breaker operating unit 32 (S14).

Therefore, power generated by the power supply 30 is provided to the distribution feeder 7, which is separated from the power system, via the power converter 35 and the circuit breaker 33. That power is supplied to loads connected to the distribution feeder 7. The loads include a general load 4 and an important load 5. As a result, in the distribution feeder 7 in which independent operation is authorized, power is supplied to the loads so that lives and safeties in the area can be maintained and early start-up of restoration activities can be supported.

When the enabling signal from the enabling signal transmitting unit 15 of the monitor/control apparatus 1 ceases for a prescribed time or longer for some reason, the enabling signal receiving unit 34 detects the communication interrupt (a state that the enabling signal cannot be received) (S15). The enabling signal receiving unit 34 transmits a signal indicating prohibition of independent operation to the circuit-breaker operating unit 32 (S16).

Since the circuit-breaker operating unit 32 has already received the cut-off command from the islanding operation detecting unit 31, once it receives the prohibition signal from the enabling signal receiving unit 34, it outputs the opening signal (the cut-off signal) to open the circuit breaker 33 (S17). Incidentally, a period during which the cut-off command from the islanding operation detecting unit 31 is valid is determined in advance. In the case of receiving the cut-off command during the validity period, the circuit-breaker operating unit 32 outputs the cut-off signal to the circuit breaker 33 when it receives the prohibition signal from the enabling signal receiving unit 34.

In this way, in the present embodiment, the enabling signal transmitting unit 15 transmits the enabling signal repeatedly in a prescribed short cycle to the enabling signal receiving unit 34. When the enabling signal receiving unit 34 can not receive the enabling signal for a prescribed time or longer, it judges that independent operation is not authorized any more and transmits the prohibition signal to the circuit-breaker operating unit 32. Accordingly, so-called fail-safe is realized as preventing voltage from being generated at the distribution feeder 7, and safety of a worker can be provided for.

In the present embodiment configured in this way, in the case where a serious event occurs in a wide area due to natural disaster, for example, the distributed energy resources system 3 can be utilized effectively and the probability of power supply to the important load 5 can be enhanced. Owing to this, in the present embodiment, it is possible to maintain activities of important locations and to secure safety or the like of a local community.

As shown in FIG. 2, in the case where a power fault (PF) occurs as for power supply from the trunk power transmission network 6 to the distribution substation 2 and power supply from the distribution substation 2 to the distribution feeders 7(1) and 7(2) is stopped, power is supplied from the distributed energy resources system 3 to the distribution feeder 7(2) for which the independent operation is authorized in advance and the important load 5 can use that power.

A administrator of the monitor/control apparatus 1 judges whether the amount of power generation of the distributed energy resources system 3 and the amount of consumption (the demand) of the important load 5 in the distribution feeder 7 are almost balanced or not; when it is judged to be in a balanced state, independent operation as for the distribution feeder 7 can be authorized. It should be noted that judgment on whether the amount of power generation of the distributed energy resources system 3 and the amount of consumption of the important load 5 for each distribution feeder 7 are balanced or not can also be performed automatically, for example, by a computer system such as the management apparatus 8.

In the conventional technology, in the case where the distribution feeder 7 is separated from the power system due to an event of natural disaster or the like, it is designed to inhibit islanding operation of the distributed energy resources system 3 to secure safety of a worker. On the contrary to such a concept, in the present embodiment, islanding operation of the distributed energy resources system 3 is authorized so as to utilize the distributed energy resources system 3 effectively in the event of disaster. However, since the distributed energy resources system 3 for which islanding operation is authorized (that is, the distribution feeder 7 for which independent operation is authorized) is decided in advance, a worker can work while avoiding the distribution feeder 7 generating a voltage. Further, in the present embodiment, as described above, in the case where the enabling signal from the monitor/control apparatus 1 ceases, islanding operation of the distributed energy resources system 3 is prohibited. Accordingly, in the present embodiment, the distributed energy resources system 3 can be utilized effectively while ensuring safety of a worker in the event of disaster.

Explanation is given hereinafter on switching operation of a control method of the power converter 35 with the distributed energy resources control apparatus 201.

Explanation is given here on the case where power supply to the distribution feeder 7(2) becomes impossible due to occurrence of a fault caused by lightning strike or the like in the side of the trunk power transmission network 6 with respect to the distribution substation 2 in the power system shown in FIG. 2. Further, the distribution substation 2 is assumed to separate the distribution feeder 7(2) which fulfills power supply to the important load 5, so as to perform system operation as a separated system. Here, it is assumed that power supply capability by the power supply 30 to the important load 5 is sufficient. Incidentally, when the power supply capability is insufficient, a function to separate off unimportant general load 4 may be used when appropriate. This function may be implemented by installing an energy management system such as the HEMS (home energy management system) at a user, for example, and by cutting off the general load 4 as needed by this energy management system. Still more, the distribution substation 2 is assumed not to authorize independent operation as for the distribution feeder 7(1) which does not include an important load 5.

In the case where a system section formed by the distribution feeder 7(2) is operated independently as a separated system, the monitor/control apparatus 1 transmits the independent operation enabling signal to the distributed energy resources system 3. Meanwhile, in the case where in the distributed energy resources system 3 the islanding operation detecting unit 31 detects a system fault and the independent operation enabling signal receiving unit 34 receives the independent operation enabling signal, cut-off of a distribution line between the power supply 30 and the distribution feeder 7(2) by the circuit-breaker operating unit 32 is prohibited. In this way, interconnection of the power supply 30 to the distribution feeder 7(2) is maintained. This operation follows the above-described S11 to S14. The islanding operation detecting unit 31, for example, stores the detection results onto a memory device. The independent operation enabling signal receiving unit 34, for example, stores the reception results onto a memory device. Then, the power converter control unit 202 switches a control method of the power converter 35 based on the detection results by the islanding operation detecting unit 31 and the reception results by the independent operation enabling signal receiving unit 34.

The measurement monitoring unit 37 measures, as for a voltage and a frequency in the distribution feeder 7, a voltage deviation ΔV relative to a prescribed voltage and a frequency deviation Δf relative to a prescribed frequency. The prescribed voltage and the prescribed frequency are, for example, of values predetermined in the power system. The measurement monitoring unit 37, for example, stores the measurement results onto a memory device.

Figures 7, 8:
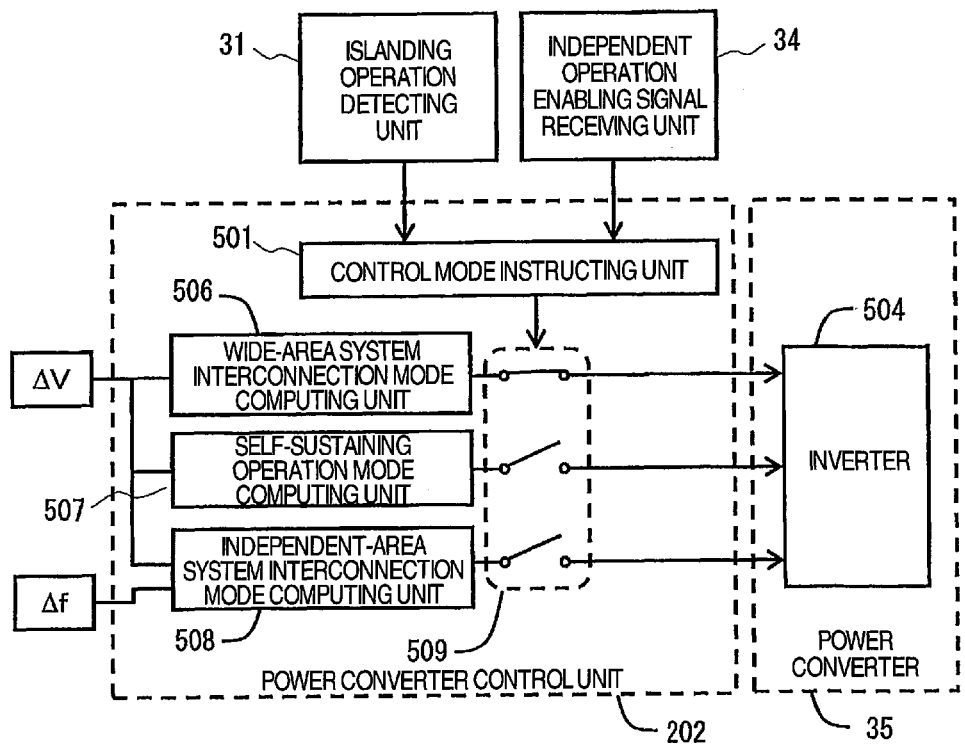
FIG. 7 shows a configuration of a power converter control unit.
FIG. 8 shows judgment criteria by a control mode instruction unit.

FIG. 7 shows a configuration of the power converter control unit 202. The power converter control unit 202 comprises a control mode instructing unit 501, a wide-area system interconnection mode computing unit 506, a self-sustaining operation mode computing unit 507, an independent-area system interconnection mode computing unit 508, and a switch 509. The power converter 35 comprises an inverter 504.

The control mode instructing unit 501 acquires an islanding operation detection signal 601, which is a detection result by the islanding operation detecting unit 31, and an independent operation enabling signal 602, which is a reception result by the independent operation enabling signal receiving unit 34, selects a control mode of the inverter 504 according to their contents, and instructs a selected control mode to the switch 509.

The wide-area system interconnection mode computing unit 506, the self-sustaining operation mode computing unit 507, and the independent-area system interconnection mode computing unit 508 perform calculations corresponding to a wide-area system interconnection mode, a self-sustaining operation mode, and an independent-area system interconnection mode, respectively. The wide-area system interconnection mode computing unit 506 acquires ΔV from the measurement monitoring unit 37. The self-sustaining operation mode computing unit 507 acquires ΔV from the measurement monitoring unit 37. The independent-area system interconnection mode computing unit 508 acquires ΔV and Δf from the measurement monitoring unit 37. The switch 509 selects one of calculation results of the wide-area system interconnection mode computing unit 506, the self-sustaining operation mode computing unit 507, and the independent-area system interconnection mode computing unit 508 in accordance with the control mode instructed by the control mode instructing unit 501, and output it as a driving signal 505 to the inverter 504.

FIG. 8 shows judgment criteria by the control mode instructing unit 501. These judgment criteria use a state of the islanding operation detection signal 601 generated by the islanding operation detecting unit 31 and a state of the independent operation enabling signal 602 received by the independent operation enabling signal receiving unit 34. Here, let a value of the islanding operation detection signal 601 when a system fault is detected be 1 and a value of the islanding operation detection signal 601 when a system fault is not detected be 0. Also, let a value of the independent operation enabling signal 602 when independent operation is not authorized be 0 and a value of the independent operation enabling signal 602 when independent operation is authorized be 1. The control mode instructing unit 501 selects a control mode 603 corresponding to a combination of the values of the islanding operation detection signal 601 and the independent operation enabling signal 602. It should be noted that the control mode instructing unit 501 may select the control mode 603 depending on existence of the islanding operation detection signal 601 and existence of the independent operation enabling signal 602, instead.

In the case where a system fault is not detected, the control mode becomes the wide-area system interconnection mode regardless of whether independent operation is authorized or not. In this way, the distributed energy resources system 3 links with the power system. In the case where a system fault is detected and also independent operation is not authorized, the control mode becomes the self-sustaining operation mode. In this way, the distributed energy resources control apparatus 201 transitions as needed to operation inside a user who owns the distributed energy resources system 3. In the case where a system fault is detected and also independent operation is authorized, the control mode becomes the independent-area system interconnection mode. In this way, the distributed energy resources control apparatus 201 makes the distributed energy resources system 3 cooperated to system operation at the system section (a separated system) while maintaining link to the power system.

First, explanation is given on a control method of the power converter 35 in the wide-area system interconnection mode. The wide-area system interconnection mode computing unit 506 makes the power supply 30 interconnected with the power system via the inverter 504. Namely, by control of the inverter 504 with a voltage-sourced current control method, efficient operation is aimed in view of maximizing power generation of the power supply 30. Here, the wide-area system interconnection mode computing unit 506 performs power factor control to cooperate to voltage management of the power system in accordance with prescribed conditions to link the power supply 30 with the power system.

Figure 9:
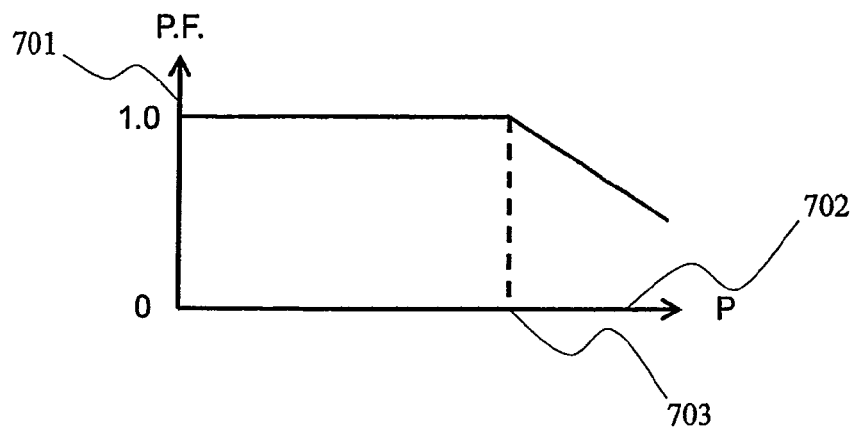
FIG. 9 shows an example of power factor control in a wide-area system interconnection mode.

FIG. 9 shows an example of power factor control in the wide-area system interconnection mode. The ordinate 701 shows the power factor (PF) and the abscissa 702 shows active power (P). In the case where the active power is equal to or lower than the predetermined threshold value 703, the wide-area system interconnection mode computing unit 506 controls the inverter 504 so that the power factor becomes 1.0. In the case where the active power exceeds the threshold value 703, the wide-area system interconnection mode computing unit 506 suppresses voltage increase of a linked point by decreasing the power factor at a constant rate against the increase in the active power.

Next, explanation is given on a control method of the power converter 35 in the self-sustaining operation mode. The self-sustaining operation mode computing unit 507 controls the inverter 504 with a voltage-sourced voltage control method. In this way, the distributed energy resources system 3 can perform power supply to a load inside the user as an emergency power supply inside the user while maintaining the voltage and the frequency.

Next, explanation is given on a control method of the power converter 35 in the independent-area system interconnection mode. Similar to the wide-area system interconnection mode computing unit 506, the independent-area system interconnection mode computing unit 508 mainly performs voltage-sourced current control to maximize power generation; however, there may be the case where different control from the control for system interconnection is added thereto. This control depends on system characteristics of a separated system which independently operates. Particularly, in the case where power supply from a power supply linked via the inverter 504 like a solar photovoltaic generation predominates and there is a scarce power supply having a rotation machine such as a diesel generator in the distributed energy resources system 3, synchronizing power of a separated system itself cannot be relied upon. Then, imbalance in reactive power in the whole separated system shows up as frequency deviation. In the case where synchronizing power is insufficient in the whole separated system in this way, the independent-area system interconnection mode computing unit 508 performs control of reactive power of the power supply 30 with the frequency deviation as an input.

Figure 10:
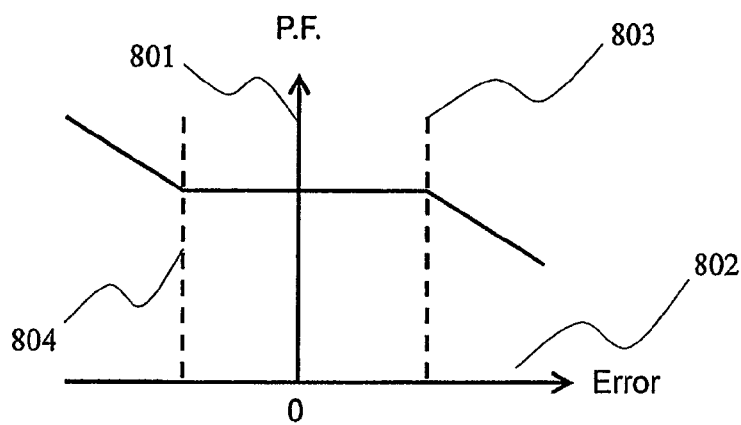
FIG. 10 shows an example of reactive power control using a frequency deviation as an input.

FIG. 10 shows an example of reactive power control with the frequency deviation as an input. The ordinate 801 shows the power factor (PF). The abscissa 802 is an index regarding the frequency deviation and adopts, for example, an integrated value of a deviation between an observed frequency and a reference frequency. In the case where the index regarding the frequency deviation like this becomes outside a range defined by predetermined upper limit 803 and lower limit 804, reactive power is adjusted by adjusting the power factor by the inverter 504 so that the frequency deviation is mitigated. Incidentally, the independent-area system interconnection mode computing unit 508 may determine the amount of adjustment of reactive power with the frequency deviation Δf as an input.

In addition, in the case where reactive power control is performed to mitigate the frequency deviation in this manner, control of the distribution line voltage of the distribution feeder 7 with reactive power control becomes difficult. In this case, the independent-area system interconnection mode computing unit 508 adds control of active power of the power supply 30 with the voltage deviation as an input.

Figure 11:
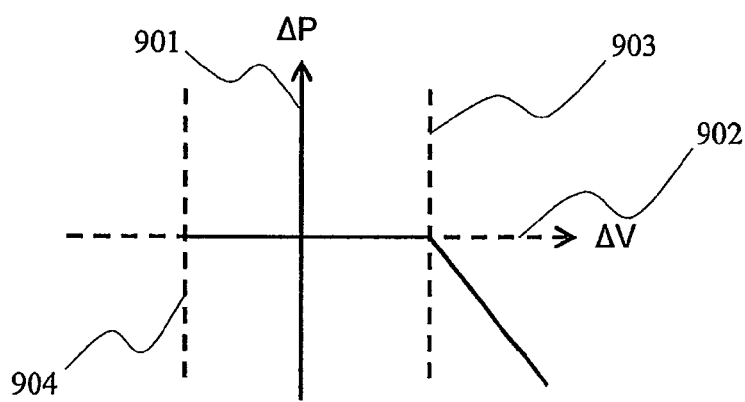
FIG. 11 shows an example of active power control using a voltage deviation as an input.

FIG. 11 shows one example of active power control with the voltage deviation as an input. The ordinate 901 is the required amount of adjustment for active power output of the power supply 30. The abscissa 902 is a deviation ΔV between a measured voltage and a target voltage at the link point. In the case where ΔV is within a range defined by an upper limit 903 and a lower limit 904, the independent-area system interconnection mode computing unit 508 does not perform adjustment of the active power. In the case where ΔV exceeds the upper limit, the independent-area system interconnection mode computing unit 508 performs voltage suppression while decreasing the active power by the inverter 504. In the case where ΔV is below the lower limit, the independent-area system interconnection mode computing unit 508 strives for maintaining the voltage by increasing the active power output by the inverter 504 or by cutting off an unimportant load (a general load 4) inside the user. For example, in the case where an energy management system such as the HEMS (home energy management system) is installed at a user and this energy management system can perform cut-off of the load inside the user, the independent-area system interconnection mode computing unit 508 asks the energy management system for cut-off of the unimportant load inside the user.

According to the present embodiment, a control method of the power converter 35 can be switched over based on the detection result which shows whether power supply from the power system to the system section is stopped or not and the independent operation enabling signal from the monitor/control apparatus 1. In this way, even in any of the case where the distributed energy resources system 3 is linked with the power system, the case where the distributed energy resources system 3 is used inside a user, and the case where the distributed energy resources system 3 is linked with a separated system, operation of the distributed energy resources system 3 can be maintained. In particular, in the case where the distributed energy resources system 3 is linked with the separated system, by performing reactive power control of a power converter based on a measured frequency, a frequency deviation caused by imbalance of reactive power can be mitigated. In addition, by performing active power control of the power converter based on a measured voltage, a voltage deviation accompanying reactive power control can be mitigated.

Further, according to the present embodiment, flexible operation of the distributed energy resources system 3 becomes possible. In particular, in addition to conventional electric power selling with wide-area system interconnection or utilization as an emergency power supply, it becomes possible that a specific system section (area) is separated out of the power system so that it becomes a separated system and a distributed energy resources system 3 in it is operated independently to make it contribute to operation of the separated system. Even in the case where a serious situation occurs in a wide area such as natural disaster, means of power supply such as independent operations of the system sections including the important loads 5 can be increased in number. By independent operation of the distribution feeder 7(2) including the important loads which are urgent and require supply for start-up which are, for example a local government facility or a hospital or the like not having an in-house power generation facility, circumstances to smoothly perform various works in restoration/recovery can be created.

Embodiment 2

Figure 12:
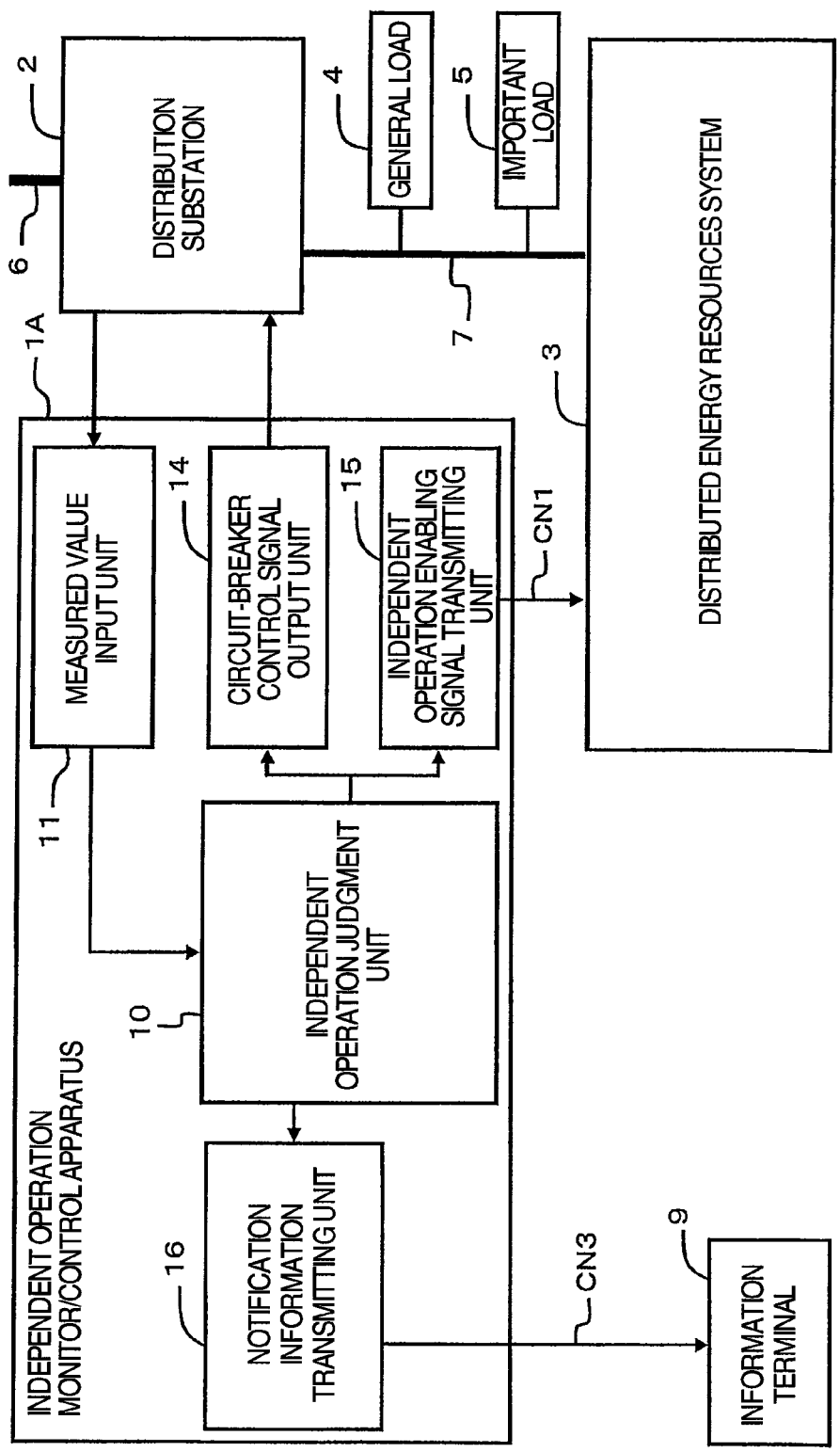
FIG. 12 shows a configuration of a power distribution system according to EMBODIMENT 2.
Figure 13:
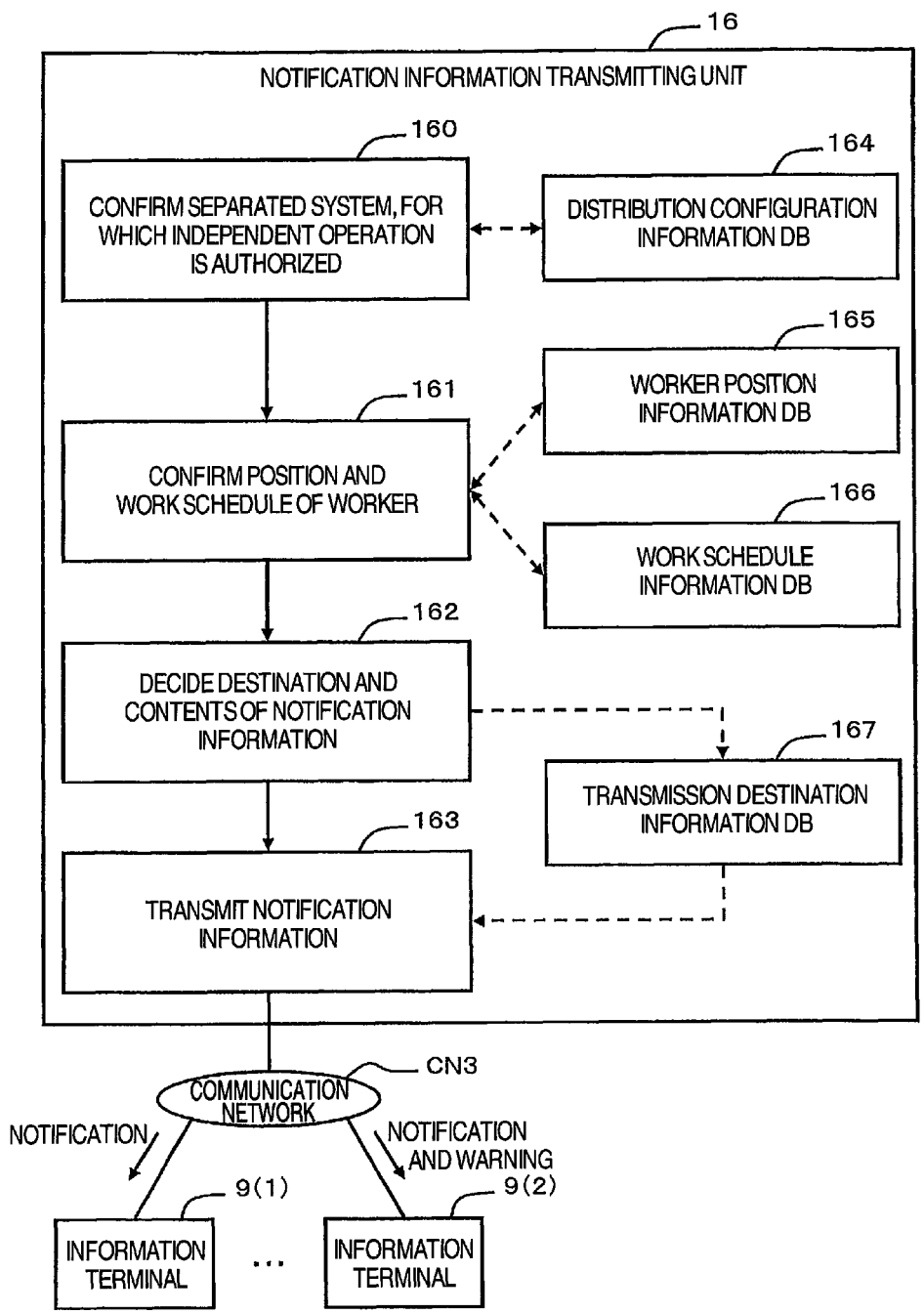
FIG. 13 shows a configuration of a notification information transmitting unit for transmitting information on independent operation to an information terminal of a worker.

Explanation is given on EMBODIMENT 2 with reference to FIG. 12 and FIG. 13. The following respective embodiments including the present embodiment are equivalent to variations of EMBODIMENT 1. Accordingly, explanation is mainly given on differences from EMBODIMENT 1. In EMBODIMENT 1, description was made on the case of setting in advance the distribution feeder 7 for which independent operation is authorized. On the other hand, in the present embodiment, it is designed to provide an alarm to a worker in the vicinity of the site as for the distribution feeder 7 for which independent operation is authorized.

In the present embodiment, respective distribution feeders 7 are rendered to automatically initiate independent operation when they are separated from the power system. In detail, when a fault occurs in the power system, the monitor/control apparatus 1A transmits the enabling signal repeatedly in a prescribed cycle toward respective distributed energy resources systems 3. Accordingly, each distribution feeder 7 independently operates in a separated state from the power system. It should be noted that, similar to EMBODIMENT 1, in the case where the enabling signal from the monitor/control apparatus 1A ceases for a prescribed time or longer, independent operation is discontinued immediately.

FIG. 12 is an example of a power distribution system including a monitor/control apparatus 1A according to the present embodiment. Compared with the monitor/control apparatus 1 of EMBODIMENT 1, the monitor/control apparatus 1A is not provided with the setting input unit 12 or the remote command receiving unit 13 corresponding to the "setting unit". In the present embodiment, since the distribution feeder 7 for which independent operation is authorized is not set in advance, configuration corresponding to the setting unit is excluded.

Further, the monitor/control apparatus 1A of the present embodiment comprises a notification information transmitting unit 16 as compared with the monitor/control apparatus 1 of EMBODIMENT 1. The notification information transmitting unit 16 is connected to a plurality of information terminals 9 via a third communication network CN3. The third communication network CN3 may be configured as a common communication network to the first communication network CN1. The notification information transmitting unit 16 is the one for transmitting prescribed notification information to the information terminals 9.

Explanation is given on the functional configuration of the notification information transmitting unit 16 with reference to FIG. 13. The notification information transmitting unit 16 comprises, for example, means for performing a plurality of processings 160 to 163 and a plurality of databases 164 to 167, which are described below.

In the first processing 160 for confirming a separated system for which independent operation is authorized, a distribution feeder identifier which specifies a separated system (the distribution feeder 7) for which independent operation is authorized is received from the independent operation judgment unit 10. In the first processing 160 the distribution feeder 7 for which independent operation is authorized is specified based on the distribution feeder identifier and a distribution configuration information database 164. In the distribution configuration information database 164, a configuration of the power distribution system and the distribution feeder identifiers are managed in a corresponded manner.

In the second processing 161 for confirming a position and a work schedule of a worker, the position and the work schedule of the worker are confirmed based on a worker position information database 165 and a work schedule information database 166. The worker position information database 165 manages an identifier of the information terminal 9 held by each worker (or an identifier of the worker) and a current position of the information terminal 9 in a corresponded manner. The position of the information terminal 9 can be measured using, for example, the GPS (Global Positioning System) or the like. The work schedule information database 166 manages the identifier of the information terminal 9 held by a worker (or the identifier of the worker) and the work schedule in a corresponded manner.

In the third processing 162 for deciding a destination and contents of notification information, a range to which notification information should be transmitted and the contents of the notification information are decided. The range to which the notification information should be transmitted denotes the information terminals 9 to which the notification information should be transmitted. The contents of the notification information designates, for example, types of messages contained in the notification information, a notification method of the notification information, or the like.

For example, to the information terminal 9 which is apart from a distribution region of the distribution feeder 7 under independent operation, a regular message is sent such as "Independent operation is in progress in District X. Work with caution". Further, for example, an emergency message such as "Danger! Stop your work once and secure your safety" is transmitted to the information terminal 9 within a distribution region of the distribution feeder 7 which is under independent operation and an alarm sound is made to rumble. A transmission destination information database 167 memorizes a transmission range and transmission contents of the notification information. The distribution region means a geometrical region where power is supplied by the distribution feeder 7.

Incidentally, such configuration may also be acceptable that the notification information is not transmitted to the information terminal 9 which is apart by the prescribed distance or more from the distribution region of the distribution feeder 7 under independent operation and is held by a worker having no work scheduled in that distribution region. In this way, the volume of communication at the time of disaster can be reduced.

In the fourth processing 163 for transmitting the notification information to the information terminal 9 the transmission destination information database 167 is referenced to transmit the notification information to the information terminal 9. In the example shown in FIG. 8, a regular message is transmitted to an information terminal 9(1) which is apart by a prescribed distance or more from a distribution region of the distribution feeder 7 under independent operation. An emergency message and an alarm signal are transmitted to an information terminal 9(2) which is close to the distribution region of the distribution feeder 7 under independent operation. The information terminal 9(2) which receives the alarm signal vibrates, rumbles a buzzer, and flickers a lamp, for example.

The distributed energy resources system 3 is similar as in EMBODIMENT 1. Therefore, the distributed energy resources control apparatus 201 can switch over a control method of the power converter 35 based on a system fault and the independent operation power enabling signal.

The present embodiment configured as above exerts similar effects to EMBODIMENT 1. Further, in the present embodiment, in the case where respective distribution feeders 7 are separated from the power system, independent operations are authorized in principle. In addition, in the present embodiment, the fact that independent operations of the distribution feeders 7 are authorized is transmitted as notification information to the information terminal 9 which a worker holds.

Then, in the present embodiment, it is not necessary to set the distribution feeder 7 in advance for which independent operation would be authorized and, thus, it can save trouble of the administrator. Further, in the present embodiment, it is possible to operate a larger number of distributed energy resources systems 3 while securing safety of a worker so that power can be supplied to more loads (the general loads 4 and the important loads 5).

Embodiment 3

Figure 14:
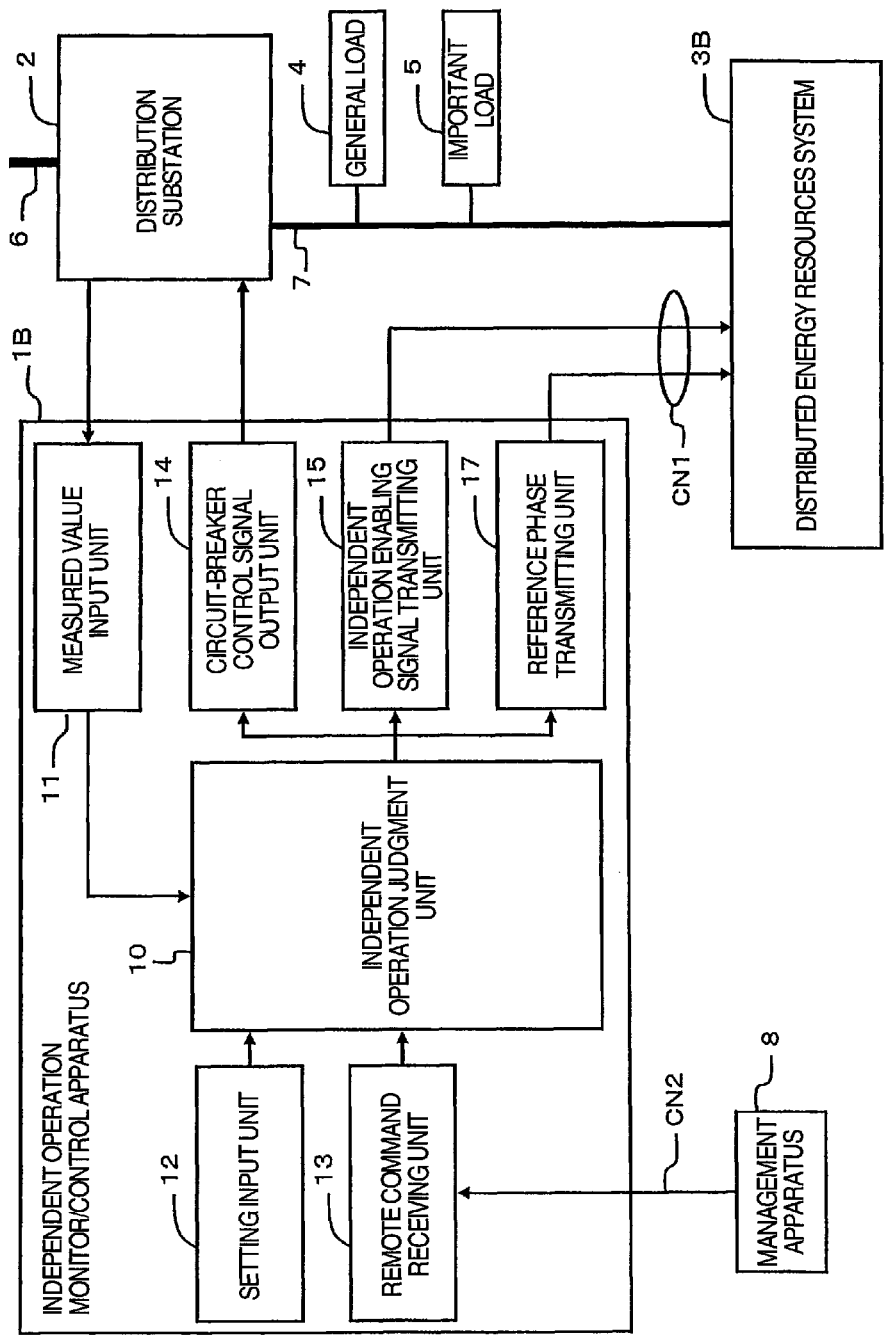
FIG. 14 shows a configuration of a power distribution system according to EMBODIMENT 3.
Figure 15:
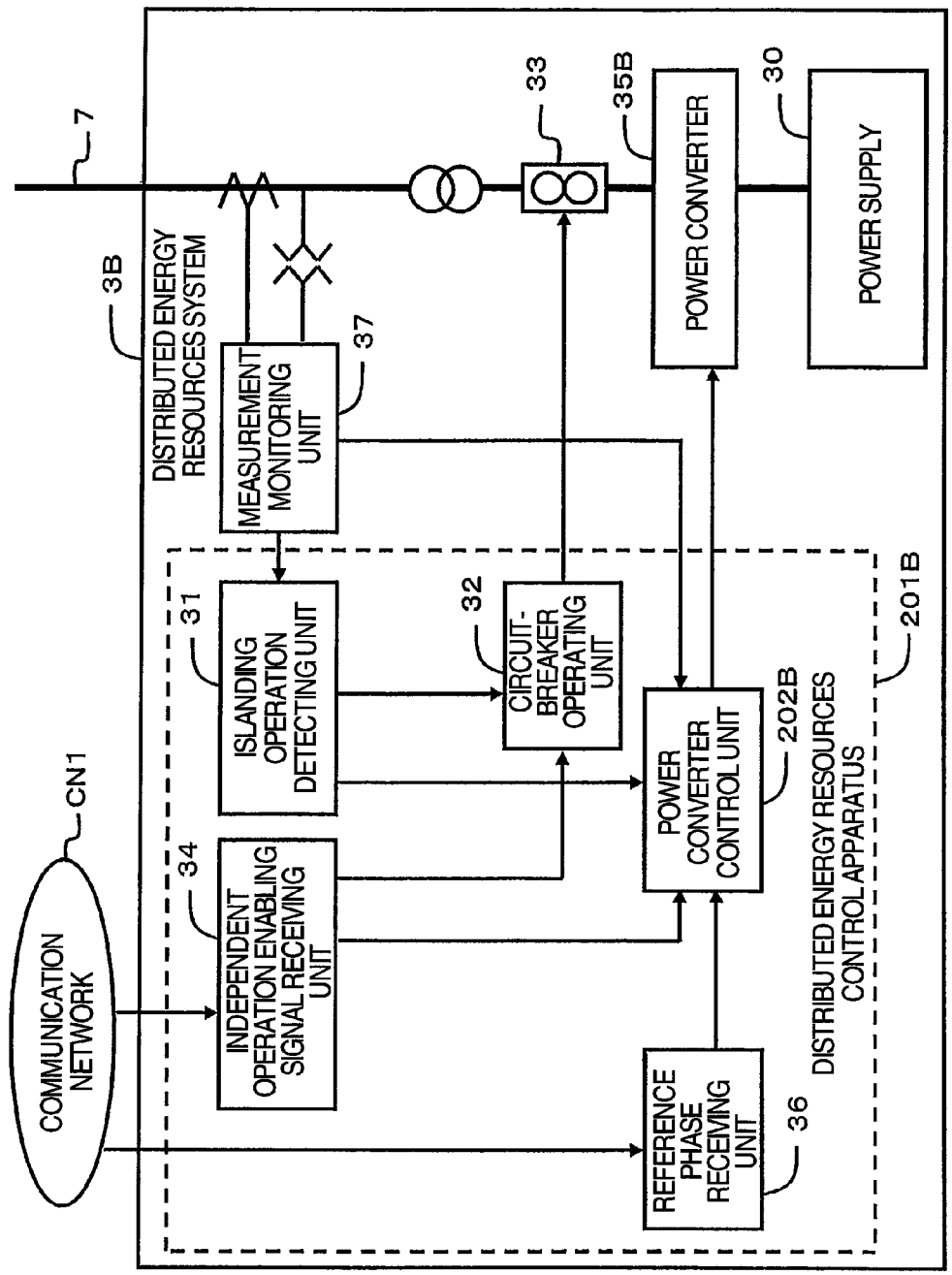
FIG. 15 shows a configuration of a distributed energy resources system according to EMBODIMENT 3.
Figure 16:
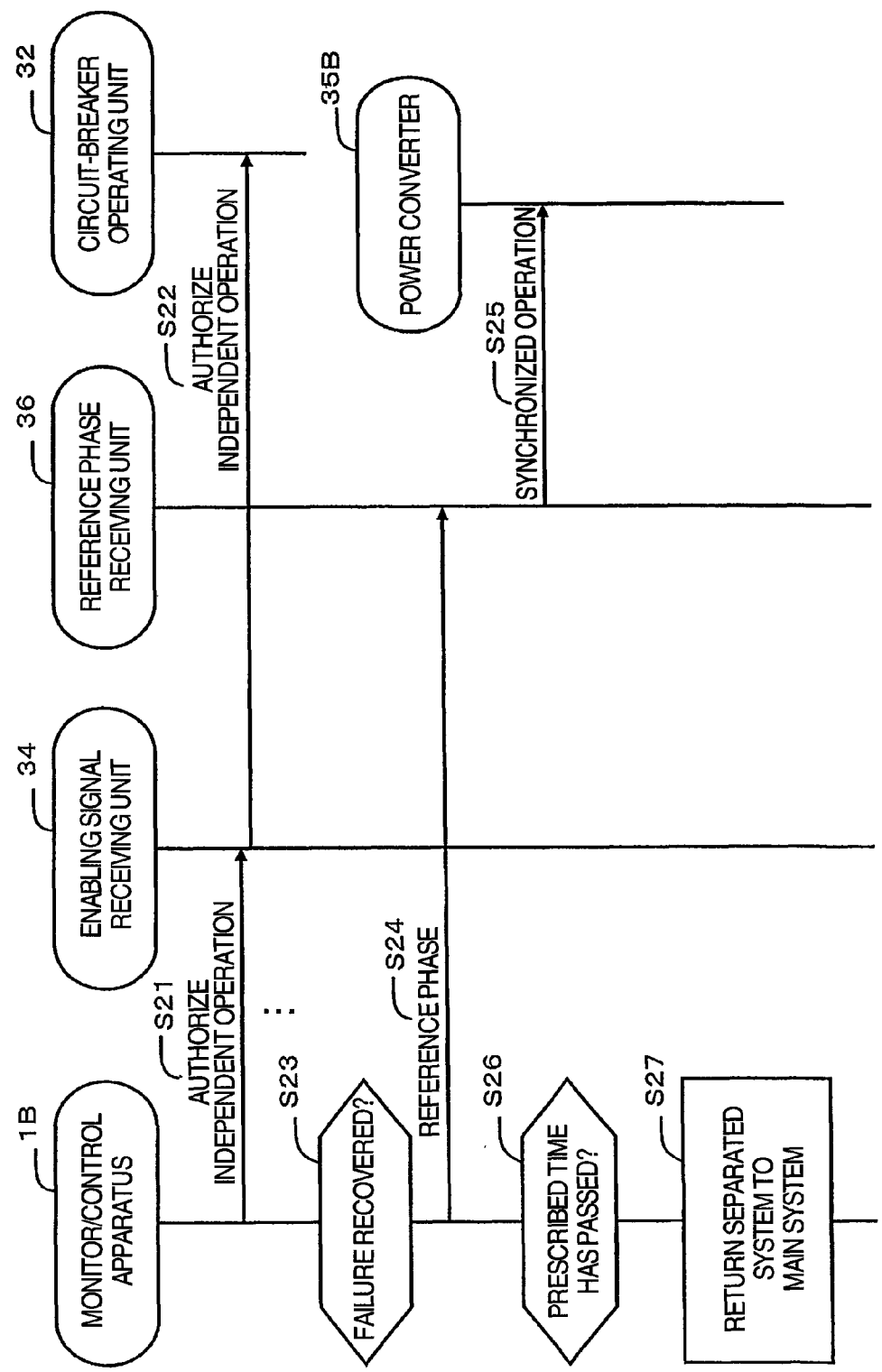
FIG. 16 is an explanatory diagram showing states of communication processings between an independent operation monitor/control apparatus and the distributed energy resources system according to EMBODIMENT 3.

Explanation is given on EMBODIMENT 3 with reference to FIG. 14, FIG. 15, and FIG. 16. In the present embodiment, the case where the distribution feeder 7 under independent operation is connected again to the power system is explained.

FIG. 14 is a configuration diagram of a power distribution system including a monitor/control apparatus 1B according to the present embodiment. The monitor/control apparatus 1B further comprises a reference phase transmitting unit 17 as compared with the monitor/control apparatus 1 of EMBODIMENT 1.

The reference phase transmitting unit 17 has a function to transmit a reference phase of the main system side to the distributed energy resources system 3. The main system side here designates the upstream side (the high voltage side) of the circuit breaker 22 viewed from the distribution feeder 7 which becomes a separated system. Specifically, the main system side is a side of the bus bar 20 shown in FIG. 3.

A phase of the main system (the bus bar 20) is called a reference phase. The reference phase can be calculated from a voltage value acquired via the measured value input unit 11. When a fault of the main system side is restored and power supply from the trunk power transmission network 6 to the distribution substation 2 is recovered, the reference phase is calculated. The calculated reference phase is transmitted to the distributed energy resources system 3 via the first communication network CN1.

FIG. 15 shows a configuration example of a distributed energy resources system 3B according to the present embodiment. The distributed energy resources system 3B of the present embodiment comprises a distributed energy resources control apparatus 201B in place of the distributed energy resources control apparatus 201 and comprises a power converter 35B in place of the power converter 35 as compared with the distributed energy resources system 3 of EMBODIMENT 1. In addition, the distributed energy resources control apparatus 201B of the present embodiment comprises a power converter control unit 202B in place of the power converter control unit 202 comprises a power converter 35B in place of the power converter 35, and further comprises a reference phase receiving unit 36 as compared with the distributed energy resources control apparatus 201 of EMBODIMENT 1. The reference phase receiving unit 36 may be configured as an electronic circuit.

The power converter 35B is an electric circuit which can convert direct current and alternate current into each other. Moreover, the power converter 35B can adjust active power, reactive power, the power factor, the phase, and the like according to instructions from the power converter control unit 202B.

The reference phase receiving unit 36 receives the reference phase transmitted from the reference phase transmitting unit 17 of the monitor/control apparatus 1B. The reference phase receiving unit 36 transmits the reference phase to the power converter control unit 202B.

Operation of the power converter control unit 202B to switch over a control method of the power converter 35B based on a system fault and the independent operation power enabling signal is similar to that of the power converter control unit 202 of EMBODIMENT 1. However, the power converter control unit 202B transmits the reference phase from the reference phase receiving unit 36 to the power converter 35B to instruct initiation of synchronized operation to the power converter 35B when the separated system is connected back again to the power system, that is, at switching over from the independent-area system interconnection mode or the self-sustaining operation mode to the wide-area system interconnection mode. When the power converter 35B initiates synchronized operation, the phase of the power output from the distributed energy resources system 3B approaches gradually to the reference phase and ultimately coincides with it.

FIG. 16 shows operation of the present embodiment. Explanation is given starting from a state that independent operation of a certain distribution feeder 7 is authorized (S21, S22).

When failure of the main system side is recovered (S23), the monitor/control apparatus 1B calculates the reference phase. The reference phase transmitting unit 17 transmits the reference phase to the reference phase receiving unit 36 (S24). The reference phase receiving unit 36 notifies the power converter 35 of the reference phase to instruct synchronized operation (S25).

The monitor/control apparatus 1B judges whether a prescribed time has passed since transmission of the reference phase to the distributed energy resources system 3B (S26). This prescribed time is set in advance as a period sufficient for the phase of the power supply of the distributed energy resources system 3B to coincide with the reference phase. When the prescribed time has passed, the monitor/control apparatus 1B closes the circuit breaker 22 via the circuit-breaker operating unit 25 and connects again the distribution feeder 7, which is a separated system, back to the bus bar 20 which is the main system (S27).

The present embodiment configured in this way also exerts similar effects as EMBODIMENT 1. Further, in the present embodiment, the distribution feeder 7, which has been under independent operation, is restored to the power system and a link between the distribution feeder 7 and the power system can be recovered.

It should be noted that the present invention is not limited to the above embodiments. Those skilled in the art can perform various additions, changes, or the like within a scope of the present invention. For example, EMBODIMENT 3 may also be applied to EMBODIMENT 2.

In addition, in the above embodiments, operation of a load (a general load 4 or an important load 5) is not especially limited; however, for example, it may be a configuration so that power consumption of the general load 4 connected to the distribution feeder 7, which is a separated system, is reduced by the so-called demand response control. With this, more power from the distributed energy resources systems 3 and 3B can be provided to the important load 5.

Furthermore, although the distribution feeder 7 is given as a unit of a section to be separated from the power system, a larger section or a smaller section than the distribution feeder 7 may be configured as separable from the power system.

At least a part of the configurations of the present invention may be implemented as a computer program. The computer program can be distributed, for example, via a communication medium such as the Internet or a memory medium such as a hard disk and a flash memory device.

Also, respective embodiments explained above may be represented as follows.
(Representation 1)

A distributed energy resources control apparatus for controlling power from a distributed energy resource in a system section separable from a power system comprising:

a detecting unit which detects a fault of the power system;
a receiving unit which receives a signal indicating authorization for the distributed energy resource to perform independent operation as linking with the system section when the system section is separated from the power system; and
a control unit which controls a power converter converting power from the distributed energy resource and outputting to the system section, based on measurement results of a voltage and a frequency of the system section, when the fault is detected and the signal is received.

Further, respective embodiments explained above may be represented as follows.
(Representation 2)

A distributed energy resources control system for controlling power from a distributed energy resource in a system section separable from a power system comprising:

a system section control apparatus which transmits a signal indicating authorization for the distributed energy resource to perform independent operation as linking with the system section when the system section is separated from the power system; and a distributed energy resources control apparatus which controls power from the distributed energy resource, the distributed energy resources control apparatus comprising:
  a detecting unit which detects a fault of the power system;
  a receiving unit which receives a signal indicating authorization for the distributed energy resource to perform independent operation as linking with the system section when the system section is separated from the power system; and
  a control unit which controls a power converter converting power from the distributed energy resource and outputting to the system section, based on measurement results of a voltage and a frequency of the system section, when the fault is detected and the signal is received.

In these representations, the distributed energy resources correspond to, for example, the power supply 30. Also, the detecting unit corresponds to, for example, the islanding operation detecting unit 31. In addition, the receiving unit corresponds to, for example, the independent operation enabling signal receiving unit 34. Further, the control unit corresponds to, for example, the power converter control units 202 and 202B. Moreover, the system section control apparatus corresponds to, for example, the independent operation monitor/control apparatuses 1, 1A, and 1B.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A distributed energy resources control apparatus for controlling power from a distributed energy resource in a system section separable from a power system comprising:
  a detecting unit which detects a fault of the power system;
  a receiving unit which receives a signal indicating authorization for the distributed energy resource to perform an independent operation as linking with the system section when the system section is separated from the power system; and
  a control unit which controls a power converter converting power from the distributed energy resource and outputting to the system section, based on measurement results of a voltage and a frequency of the system section, when the fault is detected and the signal is received, wherein the measurement results comprise a voltage deviation of the system section relative to a prescribed voltage, and wherein the detecting unit transmits a cut-off command to cut off between the system section and the distributed energy resource, and the control unit controls the power converter with a voltage-sourced voltage control method, based on the voltage deviation, when the fault is detected and the signal is not received.

2. The distributed energy resources control apparatus according to claim 1, wherein the measurement results comprise a frequency deviation of the system section relative to a prescribed frequency and wherein the control unit adjusts reactive power of the power converter, based on the frequency deviation, when the fault is detected and the signal is received.

3. The distributed energy resources control apparatus according to claim 1, wherein the measurement results comprise a frequency deviation of the system section relative to a prescribed frequency and wherein the control unit adjusts a power factor of the power converter, based on the frequency deviation, when the fault is detected and the signal is received.

4. The distributed energy resources control apparatus according to claim 2, wherein the measurement results comprise a voltage deviation of the system section relative to a prescribed voltage and wherein the control unit adjusts active power of the power converter, based on the voltage deviation, when the fault is detected and the signal is received.

5. The distributed energy resources control apparatus according to claim 1, wherein the measurement results comprise a voltage deviation of the system section relative to a prescribed voltage and wherein the control unit controls the power converter in accordance with a voltage-sourced current control method, based on the voltage deviation, when the fault is not detected.

6. The distributed energy resources control apparatus according to claim 1, wherein a cut-off command to cut off between the system section and the distributed energy resource in accordance with detection of the fault by the detecting unit is made invalid, when the signal is received.

7. A distributed energy resources control method for controlling power from distributed energy resources in a system section separable from a power system comprising the steps of:

making a system section control apparatus transmit a signal indicating authorization for the distributed energy resource to perform independent operation as linking with the system section, when the system section is separated from the power system;

making a distributed energy resources control apparatus detect a fault of power supply from the power system to the system section; and making the distributed energy resources control apparatus control a power converter converting power from the distributed energy resource and outputting to the system section, based on measurement results of a voltage and a frequency of the system section, when the fault is detected and the signal is received, wherein the measurement results comprise a voltage deviation of the system section relative to a prescribed voltage, and wherein the detecting unit transmits a cut-off command to cut off between the system section and the distributed enemy resource, and the control unit controls the power converter with a voltage-sourced voltage control method, based on the voltage deviation, when the fault is detected and the signal is not received.

* * * * *